Figure 1:
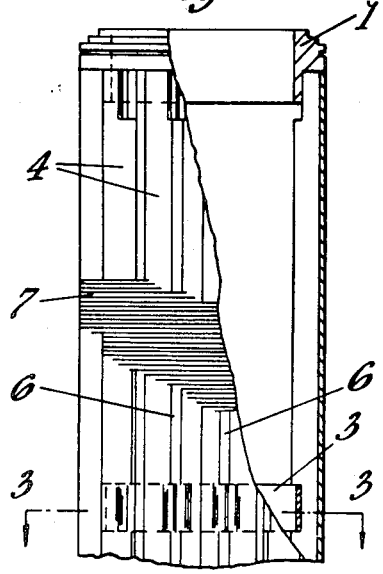

Sept. 17, 1963    O. C. KERRISON ETAL    3,104,224
FILTERS FOR LIQUIDS
Filed July 8, 1960

Inventors
O. C. Kerrison
K. Senior
By  Attys weight and economical to manufacture but

United States Patent Office 3,104,224
Patented Sept. 17, 1963

3,104,224
FILTERS FOR LIQUIDS
Oscar Carl Kerrison, London, and Kenneth Senior, Frinton, England, assignors to The Paterson Engineering Company Limited, London, England
Filed July 8, 1960, Ser. No. 41,662
Claims priority, application Great Britain July 17, 1959
1 Claim. (Cl. 210—497.1)

This invention relates to filters of the kind in which the filtering medium consists of siliceous earth, kieselguhr or similar material deposited from suspension in liquid on to a porous or permeable support.

In one form of prior construction said support consists of a wire wound helically upon a former, the clearance between adjacent turns being sufficiently small to ensure that the filtering medium will not pass through but will form a compact bed on the outside of the helix.

In such prior constructions it has been the practice to provide a series of holes in the wall carrying the ribs upon which the wire winding is superimposed. Apart from the labour and cost involved in the drilling of a multitude of holes, the distribution of the flow of liquid is necessarily localised at these points and this may result in an uneven deposit of the filter bed upon the winding. It is also a disadvantage of this known construction that should any dirt be carried through before the filter bed is formed and compacted, obstruction may occur by deposition in the water channels by reason of the relatively quiescent flow of the liquid at the points of greatest distance from the orifices.

The object of the present invention is to overcome the difficulties above referred to and to provide a filter element which passes an identical flow of liquid throughout with a minimum friction head loss.

A further object of the invention is to provide a filter element which is much easier to clean than has heretofore been proposed.

The invention consists in a filter element for use in a filter of the kind referred to in which the permeable support is supported upon a former comprising at least two co-axial ring-like members to which are attached a number of parallel circumferentially spaced longitudinal members which each present a narrow face for contact by the permeable support and narrow longitudinal slots between said longitudinal members for the passage of liquid into the interior of the element, and from the interior to the exterior of the element during the cleansing process.

The invention further consists in a filter element as set forth in the preceding paragraph in which the longitudinal members are of hollow V-section with the point of the V facing outwards.

The invention still further consists in a construction as set forth in the preceding paragraph in which the V-shaped sections have formed thereon turned-out flanges where they cross the ring-like members and by which they are attached to the latter.

Figure 2:
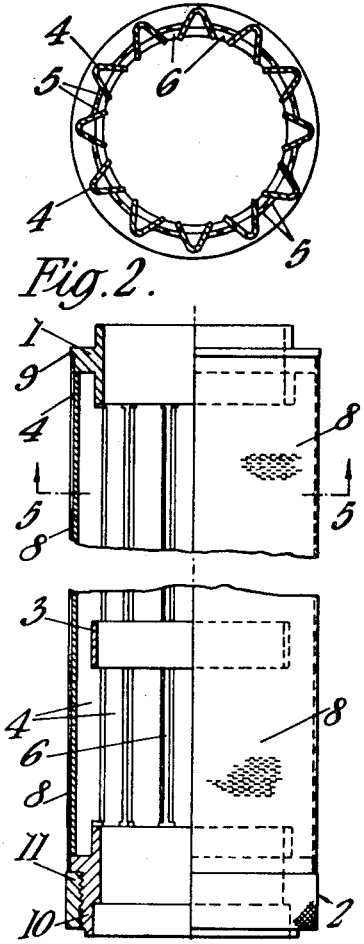
Figure 3:
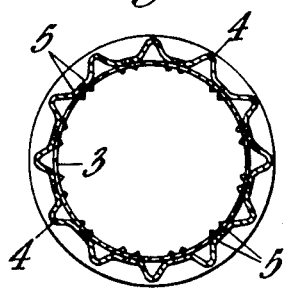
Figures 4, 5:
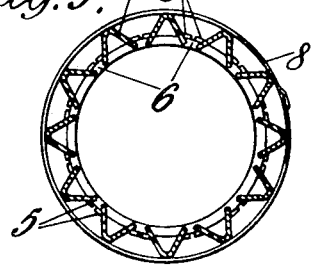

The accompanying drawing shows, by way of example only, two embodiments constructed in accordance with the invention in which:

FIGURE 1 is a part section part elevation of a first form of construction;
FIGURE 2 is a cross section on the line 2—2 of FIGURE 1;
FIGURE 3 is a cross section on the line 3—3 of FIGURE 1;
FIGURE 4 is a part section part elevation of a second form of construction; while
FIGURE 5 is a cross section on the line 5—5 of FIGURE 4.

The filter element illustrated is constructed preferably of metal and comprises end rings 1 and 2 and an intermediate ring 3 which form the support for the longitudinal members 4 which comprise hollow V-sections. Where the latter cross the end and intermediate rings they are provided with turned-out flanges 5 by means of which they are spot welded or otherwise attached to the rings. This form of construction makes the element not only light in is also very rigid.

The longitudinal members are spaced at regular distances from adjacent ones, thus forming longitudinal slots 6 for the passage of the liquid. The indentations into which the wire 7 is wound, which on previous constructions were required to be screw cut, can, in this improved construction, be conveniently pressed at the same time as the ribs are formed.

FIGURES 4 and 5 show an embodiment of the invention using a metal sheet with slotted perforations which has been rolled into a cylindrical form and spot welded. End rings 1 and 2 and intermediate ring 3 carry a number of V-shaped ribs 4 with the point of the V outwards, the ribs having turned-out flanges 5 formed where the supporting rings are placed and where the ribs can be spot welded to the rings, thus leaving slots 6 between adjacent ribs which are spaced apart, the slots providing passage for liquid between the ribs and the interior of the element. End ring 1 is made with a shoulder 9 to locate one end of the perforated cylinder 8, and end ring 2 is provided with a screw thread 10 and a screwed sleeve 11 to retain the cylinder at the other end.

With the improved construction in accordance with the invention the longitudinal slots down the entire length of the filter element, between support rings, ensure that a perfectly uniform deposit of the filter bed from end to end takes place.

It is a further advantage that the valleys between the ribs below the permeable support cannot be choked with, for example, dirt carried through before the filter bed has formed and compacted, as the flow of liquid through the filter is constrained to pass between the ribs at an increasing velocity due to the narrowing channel, and any obstruction is immediately swept into the waterway within the element. In the case of any adhesive matter being deposited the gaps are wide enough to permit a thin brush of nylon or other bristle to be inserted from within the element to clear away any gelatinous or sticky deposit.

The long continuous slots between the ribs also ensure a uniform draw-off through the filter bed upon the wire winding or perforated cylinder, with the result that all parts of the bed are uniformly active. The use of these slots in combination with the apertures in the permeable support ensures that every square centimetre of the filter area passes an identical volume of liquid with a minimum frictional head loss.

Where the cleaning of the filter is effected by the use of a body of compressed air to force water at high velocity outwardly through the permeable support in order to dislodge the filter bed and its accumulated impurities, it has been determined by experiments that with the arrangement disclosed in the present specification the water under sudden air pressure is forced through the slots at uniform velocity, which produces a more violent and constant displacement of the filter bed than has been possible hitherto with the use of holes through the webs between the longitudinal ribs.

The explosive effect of the sudden application of compressed air in the head of the filter displacing instantaneously a volume of liquid outwardly through the continuous slots between the longitudinal members ensures a more complete removal of the filter bed and its accumulated impurities than has hitherto been possible with conventional types of filter construction.

It is to be understood that the above description is by way of example and that the longitudinal members may be made of other cross section shape and the element may be made of other materials such as plastics and other details for carrying the invention into effect may be varied without departing from the scope of the invention claimed.

We claim:

Filter element for supporting a filter medium of siliceous earth deposited out of suspension in a liquid comprising at least two coaxial metal ring-like members, said ring-like members being axially spaced along the length of the filter element, a plurality of elongated parallel metal support members of hollow V-shaped cross section circumferentially spaced around the ring-like members, said elongated support members being closely spaced to provide narrow longitudinal slots therebetween, said elongated support members having their apexes facing outward with respect to the axis of said filter element and upstream with respect to the flow of suspension through the filter element, thereby forming valleys therebetween having their cross sectional area progressively decreasing in the direction of said flow to cause increased velocity to prevent the slots from being choked by dirt carried through before the filter bed is formed, turned out flanges upon the sides of the support members where they cross the ring-like members and welded connections between the flanges and the ring-like members, wire locating indentations transversely of the faces of the support members and a helix of wire wound tightly around the support members in the indentations, the spacing of the indentations being such as will give such close spacing between the turns of wire as will prevent the passage of the filter medium.

References Cited in the file of this patent
UNITED STATES PATENTS

| | | |
|---|---|---|
| 1,644,121 | Greene | Oct. 4, 1927 |
| 2,126,938 | Williams | Aug. 16, 1938 |
| 2,667,272 | Tursky | Jan. 26, 1954 |